No. 607,180. Patented July 12, 1898.
F. B. LANDIS.
PIPE COUPLING.
(Application filed Feb. 13, 1893. Renewed Dec. 17, 1897.)

(No Model.)

Witnesses:-
D. N. Haywood
V. J. Evans

Inventor:-
F. B. Landis.
By E. M. Marble
Atty.

THE NORRIS PETERS CO., PHOTO-LITHO., WASHINGTON, D. C.

UNITED STATES PATENT OFFICE.

FREDERICK B. LANDIS, OF ST. LOUIS, MISSOURI, ASSIGNOR TO THE AMMONIA REFRIGERATING AND SUPPLY COMPANY, OF SAME PLACE.

PIPE-COUPLING.

SPECIFICATION forming part of Letters Patent No. 607,180, dated July 12, 1898.

Application filed February 13, 1893. Renewed December 17, 1897. Serial No. 662,340. (No model.)

*To all whom it may concern:*

Be it known that I, FREDERICK B. LANDIS, a citizen of the United States, residing at the city of St. Louis, in the State of Missouri, have invented certain new and useful Improvements in Pipe-Couplings, of which the following is a specification, such as will enable others skilled in the art to which it appertains to make and use the same.

The object of this invention is to provide a coupling for metallic pipes which shall be simple of form, cheap of construction, and easily put together and taken apart and which, while allowing the pipes joined by it to contract and expand through widely-varying degrees of temperature, will yet at all times maintain a perfectly tight joint between such pipes, and thus prevent all leakage of whatever fluid is passing therethrough.

This invention consists in providing the ends of the pipes desired to be coupled together with flanges or rings which are secured thereto adjacent to the ends thereof, encircling the ends of the pipes with a ring, between which and the rings secured to the pipe ends are located rings of compressible packing material, like rings of compressible packing material being also located on the other side of the pipe-rings inclosing the various rings in a casing and forcing the ends of the pipes together within the casing, so as to compress the packing-rings within the same, as fully set forth in the following specification, of which the accompanying drawings form a part, wherein similar numerals of reference designate like or equivalent parts wherever found throughout the several views, and in which—

Figure 1:
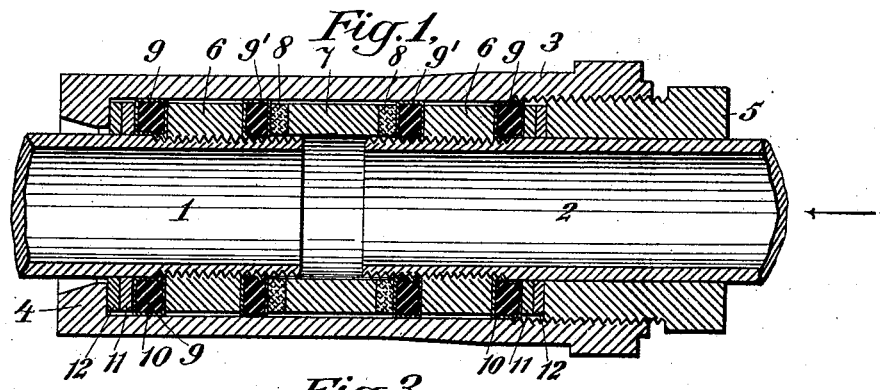
Figure 2:
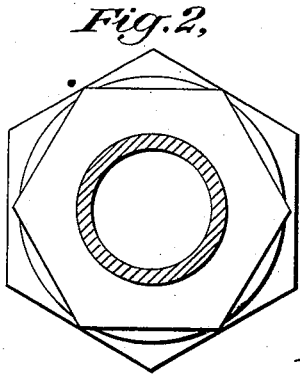

Figure 1 is a view in central longitudinal section of the abutting ends of two lengths of pipe coupled together by this improved coupling; Fig. 2, an end view of such coupling, looking in the direction of the arrow shown in Fig. 1, the pipe 2 only being shown in section; and Figs. 3 and 4, views in central longitudinal section of modified forms of the construction shown in Fig. 1.

Figure 3:
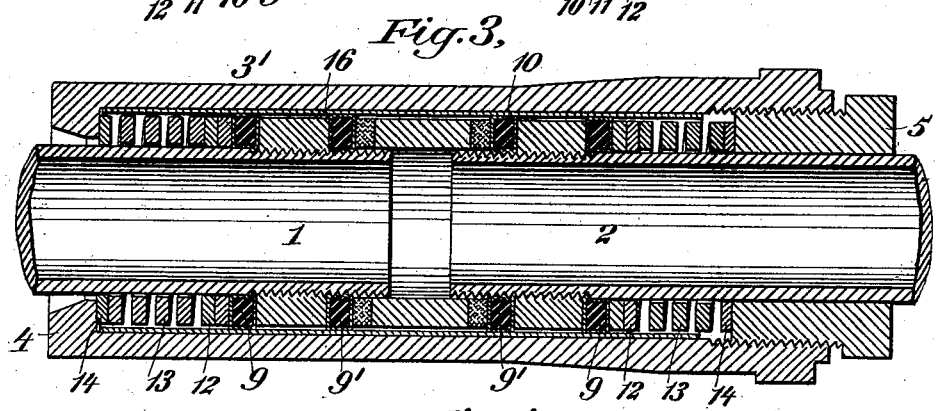
Figure 4:
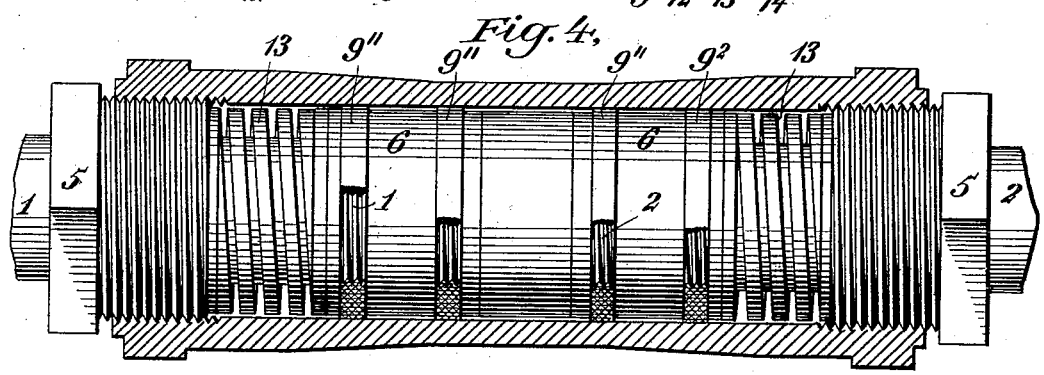

The construction shown in Figs. 1 and 2, together with the manner of operating or coupling and uncoupling the device, will be first fully described and set out herein, after which the modified forms of such coupling, which are shown in Figs. 3 and 4, will likewise be fully explained.

Referring to the drawings, the numerals 1 and 2 designate two similar sections of pipe, the ends of which are exteriorly threaded, as shown, which it is desired to couple together with this improved coupling, the main portion of which consists of a shell or casing 3, of a size larger than the outer diameter of the pipe, so as to leave a space between the walls of such shell and the pipe for the insertion of proper packing material. This shell or casing 3 is partially closed at one end, which for convenience will hereinafter be termed the "rear," by a bottom 4, having a central opening of barely sufficient size to allow the free passage therethrough of the pipe 1, such opening being made, preferably, slightly outwardly flaring, as shown, in order to lessen the chances of breakage by reason of careless handling. The other or front end of the shell or casing 3 is preferably interiorly screw-threaded, as shown, and is adapted to receive a correspondingly exteriorly-screw-threaded bushing 5, the smooth central hole of which, like that in the bottom 4, is of barely sufficient size to allow such bushing to slide easily along the pipe 2. For convenience in screwing such bushing and shell together they are each preferably provided with hexagonal heads, as shown in Fig. 2, and although any suitable metal may be used for forming the same by reason of its extreme cheapness ordinary cast-iron has been found preferable therefor.

Screwed back upon the threaded ends of the pipes 1 and 2 are interiorly-threaded rings 6, adapted to slide easily within the casing 3. These rings 6 are of such narrow width compared with the screw-thread on the pipes as to leave a considerable portion of such screw-thread on both sides thereof, especially at the extreme end of the pipe, uncovered when screwed back upon such pipes. Encircling the uncovered end portions of such pipes 1 and 2 and forming a communication between the same is a smooth-surfaced ring 7 of substantially the same diameter as the rings 6, and like them formed of wrought iron or steel. Also encircling the pipes 1 and 2 and abutting against the ends of the smooth ring 7 are preferably placed rings or washers 8, of lead or other suitable soft compressible metal, and likewise encircling the said pipes at either side of the rings 6 are rings or washers 9 and 9', of some suitable elastic packing material, preferably soft rubber, which are preferably inclosed in a wrapping or casing 10, of tin-foil or other thin soft metal or other substance which is impervious to air and other gases, by which the rubber is kept from contact with the air or with the fluid in the pipes and its consequent deterioration and loss of elasticity prevented. Also encircling the pipes in the same manner and abutting against the outer edges of the two outer elastic rings 9 are preferably placed rings or washers 11, of lead or other soft compressible metal, and outside of these in turn are also preferably placed rings or washers 12, of iron or other suitable hard metal.

The operation of coupling the two pipes 1 and 2 together by means of the said coupling is as follows: The shell or casing 3 is first slipped over the end of the pipe 1, which passes first through the central hole in the bottom 4, the first iron washer 12, lead washer 11, and rubber packing 9 being then slipped over the end of such pipe 1. The interiorly-threaded ring 6 is next screwed upon the threaded end of such pipe and the rubber packing-ring 9' and lead ring or washer 8 slipped into position next to the ring 6 over the extreme end of said pipe, the rubber rings 9 and 9' being of course wrapped in the covering 10, of tin-foil or other suitable material when the same is used, before being placed in position upon the pipe. The pipe 2 is next prepared for coupling in the same manner by slipping the bushing 5 upon the same and placing upon the end thereof the washers 12, 11, and 8, packing-rings 9 and 9', and interiorly-threaded rings 6 in the same manner and in the same order as that heretofore described for the pipe 1. The shell or casing 3 is then pulled over the end of the pipe 1 until the bottom 4 of such casing comes in contact with the washer 12 on such pipe. The loose ring 7 is then inserted in the casing 3, as is also the end of the pipe 2, and the bushing 5 being then slipped along the pipe 2 and screwed in the threaded mouth of such shell or casing tightly enough to compress the elastic rings 9 and 9', so that the same swell outwardly and inwardly until they completely fill the space between the pipes 1 and 2 and the encircling walls of the shell or casing 3, when the coupling will be complete. Whenever it is desired to uncouple said pipes 1 and 2 and remove the coupling therefrom, this may of course be done simply by a reversal of the process above described.

It will be seen upon an examination of Fig. 1 that the loose ring 7 prevents the fluid passing through the coupling from coming in contact with the cast-iron shell or casing 3, and as cast-iron is so porous as to allow many fluids—such as anhydrous ammonia, &c.—to pass through the same, and consequently wrought iron or steel pipes are necessarily used for conveying such fluids, if the loose ring 7, of wrought iron or steel, were not used in this improved coupling the shell or casing 3 would in those couplings designed for use in coupling anhydrous-ammonia pipes necessarily have to be made of cast-iron of such thickness as to be unwieldy or of wrought iron or steel, whereby the cost of the same would be much increased. The coupling having been made thoroughly tight by screwing tightly home the bushing 5, so as to compress the rings of elastic packing material 9 and 9', as hereinbefore described, any expansion and increase in the length of the pipes 1 and 2 by reason of a rise in temperature will but serve to more tightly compress the packings 9' between the inner edges of the rings 6 and the lead washers 8, which abut against the loose ring 7, while the natural elasticity of the packing-rings 9 will serve to keep the joint formed thereby fairly tight, although somewhat loosened by such expansion. In like manner when the pipes 1 and 2 are contracted by reason of a fall in temperature the packing-rings 9 will be forced against the lead rings or washers 11, which will in turn be forced against the iron washers 12, which are held in place by the bottom 4 and bushing 5, respectively, and such packing-rings 9 will consequently be still more tightly compressed between the ends of the rings 6 and the washers 11, while the natural elasticity of the rings 9' will this time act to keep the joint formed thereby comparatively tight in the same manner as did the elasticity of the rings 9 when the rings 9' were compressed by the expansion of the pipes, as hereinbefore described. From this it will be seen that when the coupling has once been made tight in order to leak through the same whatever fluid is in the pipes 1 and 2 must first force its way past two comparatively perfect packings, one or the other of which must necessarily maintain its tightness through all the varying degrees of temperature to which the coupling and the pipes may be subjected.

In the modified form of coupling shown in Fig. 3 the casing 3' is somewhat longer than the casing 3 of Fig. 1, though otherwise similar in construction thereto. The additional length of the casing affords room for two spiral springs 13, one upon each of the pipes beyond the metal rings 12. Beyond the springs 13 and adjacent to the end of the casing and to the gland 5 are two metal washers 14, which receive the thrust of the springs and transmit the same to the casing and to the gland; but, if desired, these washers may be dispensed with and the springs caused to bear directly against the end of the casing and against the gland 5.

The use of the springs 13 is attended with many advantages. By their use it is possible to compress the packing without undue exertion when putting the coupling together; but another and more important advantage is that when the springs are used it is possible to substitute for the rubber packing-rings rings composed of asbestos or other suitable packing material which, although inelastic, is not liable to deteriorate through age or through contact with the fluid in the pipes.

In the form of coupling shown in Fig. 4, in which springs 13 are used, as in Fig. 3, asbestos packing-rings are shown. The elasticity of the springs keeps the packing-rings compressed in the same manner as will the natural elasticity of the rubber rings of the coupling shown in Fig. 1, and inasmuch as both the springs and the asbestos rings are practically unaffected by lapse of time or by any chemical influences to which they may be exposed the joints of the coupling will remain tight without care or attention for many years. The use of the springs 13 is likewise attended with another advantage where used on pipe-lines which may be subjected to great changes of temperature—as, for instance, on pipe-lines used for conveying anhydrous ammonia. In such cases if, through a break in the line or for other reasons, there is a sudden and great expansion of the fluid in the pipes there results a marked fall in temperature and a correspondingly great contraction in length of the pipes affected thereby; but such contraction will merely result in compressing the springs 13, the coupling thus acting as an expansion-joint, while the joints are kept perfectly tight by the outer packing-rings 9, which, because of the increased pressure on them, are even tighter than before.

For many uses where great elasticity is not required asbestos rings may be substituted for the inner rubber packing-rings 9' of Fig. 1, the elasticity of the outer rings 9 being relied upon to keep the joints tight.

Since the casing 3 or 3' will ordinarily be formed of cast-iron, its inner surface will, as a rule, be somewhat rough, and it is possible that the packing-rings, being forced against the rough surface of the casing, may stick, particularly if the coupling is left undisturbed for a considerable length of time. To obviate this difficulty, the packing-rings may be surrounded by a thin thimble 16 of some smooth material, as tin, as shown in Fig. 3. When the packing-rings are compressed in tightening the joints, this thimble will be forced out against the wall of the casing and will form a tight joint therewith, while, since the surface of the thimble is smooth, the packing will not stick to it.

Fig. 4 illustrates not only the asbestos packing-rings numbered 9'', but also a modified form of casing in which both ends are provided with bushings 5, so that the joints may be tightened from either end of the coupling, an advantage under some circumstances; but otherwise the construction of this coupling is the same as that of the coupling shown in Fig. 3.

I do not limit myself to the exact arrangement of the packing-rings herein illustrated or to the exact number of packing-rings employed, but may increase or diminish the same in accordance with the requirements of the situation in which the coupling is to be placed.

Having now particularly described my said invention, its construction and operation, what I claim, and desire to secure by Letters Patent, is—

1. In a pipe-coupling, the combination, with a casing inclosing the ends of the pipes and having an internal diameter greater than the diameter of said pipes, stationary rings projecting from the pipes at a suitable distance from the ends thereof, and a ring lapping over the adjacent ends of said pipes, arranged to slide thereon and fitting closely thereto and adapted to impede the escape of gas from said pipes, of compressible packing material surrounding said pipes and placed between said stationary rings and said lapping ring, and means for compressing said packing material, substantially as described.

2. In a pipe-coupling, the combination, with a casing inclosing the ends of the pipes and having an internal diameter greater than the diameter of said pipes, a ring lapping over the adjacent ends of said pipes, fitting closely thereto but arranged to slide thereon, and adapted to impede the escape of gas from said pipes, and projecting rings screwing onto said pipes and situated at a suitable distance back from the ends thereof, of compressible packing material interposed between said screw-threaded rings and said lapping ring, and means for pressing the pipes together, thereby compressing said packing material, substantially as described.

3. In a pipe-coupling the combination, with a casing inclosing the ends of the pipe, having an internal diameter greater than the diameter of said pipes, and having at one end an internal flange apertured to permit the pipe to pass freely therethrough, stationary rings projecting from the pipes at a suitable distance from the ends thereof, and a ring lapping over the adjacent ends of said pipes, arranged to slide thereon, but fitting closely thereto and adapted to impede the escape of gas from said pipes, of compressible packing material surrounding said pipes and placed between said stationary rings and said lapping ring, a gland screwing into the open end of the casing and apertured to permit the pipe to pass freely therethrough, and means for causing the screwing inward of said gland to press said pipe inward and compress the packing, substantially as described.

4. In a pipe-coupling, the combination, with a casing inclosing the ends of the pipes and having an internal diameter greater than the diameter of said pipes, and a ring lapping over the adjacent ends of said pipes, fitting closely thereto, and adapted to impede the escape of gas from said pipes, of compressible packing material surrounding the pipes and placed back of the ends of said lapping ring, rings of soft metal surrounding said pipes and likewise placed back of said lapping ring, springs surrounding said pipes and placed back of said packing material and soft-metal rings, and means for compressing said springs, thereby forcing said packing material against the walls of the tubes and casing, substantially as described.

5. In a pipe-coupling, the combination, with a casing inclosing the ends of the pipes, having an internal diameter greater than the diameter of said pipes, and having at one end an internal flange apertured to permit the pipe to pass freely through it, stationary rings projecting from the ends thereof, and a ring lapping over the adjacent ends of said pipes, arranged to slide thereon but fitting closely thereto and adapted to impede the escape of gas from said pipes, of rings of soft metal surrounding said pipes and placed adjacent to said lapping ring, packing material surrounding said pipes and placed on both sides of said stationary rings, metal rings surrounding said pipes and placed back of said stationary rings and packing material, springs surrounding said pipes and placed back of said last-named metal rings, and a gland screwing into the open end of said casing and apertured to permit the passage of the pipe therethrough, and arranged to compress said springs and packing material when screwed inward, substantially as described.

In witness whereof I have signed this specification.

FREDERICK B. LANDIS.

Witnesses:
C. MOOS,
GERALD B. O'REILLY.